May 12, 1970  T. DZUS ET AL  3,510,922
FASTENER STUD ASSEMBLY
Filed Jan. 31, 1968
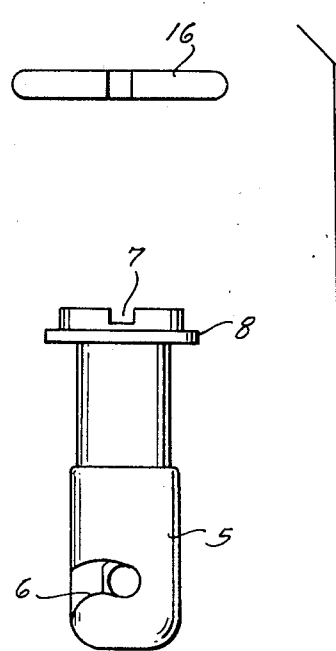
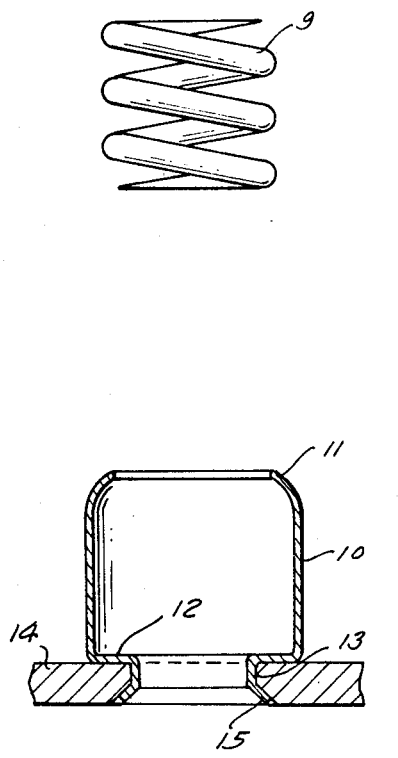
FIG.1
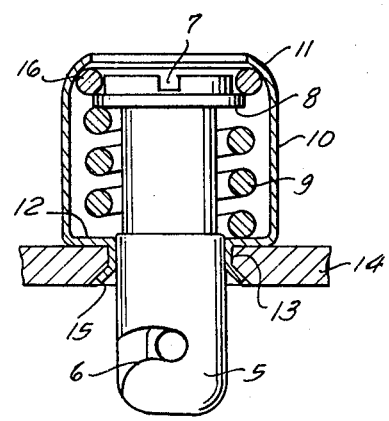
FIG.2
FIG.3
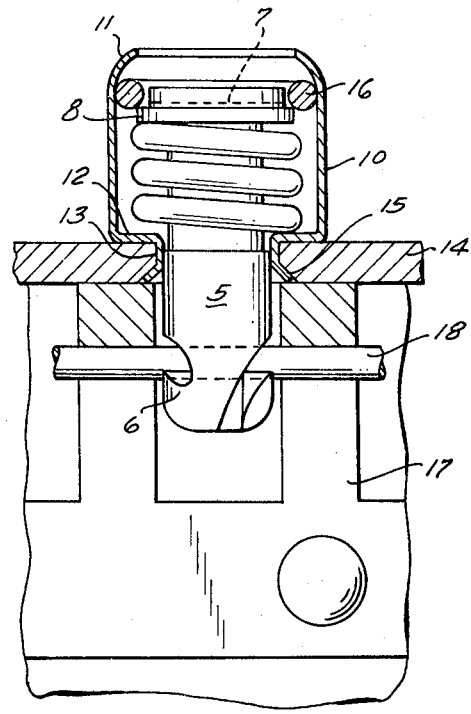
INVENTOR
THEODORE DZUS
CONRAD J. GUNTHER
BY
Kane, Dalsimer, Kane, Sullivan-Smith
ATTORNEYS United States Patent Office 3,510,922
Patented May 12, 1970

3,510,922
FASTENER STUD ASSEMBLY
Theodore Dzus, West Islip, and Conrad J. Gunther, Uniondale, N.Y., assignors to Dzus Fastener Co. Inc., West Islip, N.Y., a corporation of New York
Filed Jan. 31, 1968, Ser. No. 701,908
Int. Cl. A44b 17/00; F16b 43/00
U.S. Cl. 24—221
3 Claims

ABSTRACT OF THE DISCLOSURE

A fastener stud assembly including a cup to enclose a headed stud, encircled by a spring, is given its final form at the time of manufacture, such that a bucking tool may be inserted therein to engage with the base cup surfaces. So engaged the cup flange may be readily flared to secure that cup to a desired mounting. Thereafter, the cup receives the stud encircled by a spring; a supported latch element movable with the stud is employed to retain these parts within the cup. Also, by such preforming of the cup, it may be anodized, coated, or otherwise treated at the time of manufacture, with no danger of subsequent cracking, or spoilage of the finish; this being due to the fact that the outer cup end is not subjected to a constricting action to retain the stud and spring therein.

Background of the invention

The present invention relates to fasteners of the type shown in the prior United States Patents to Dzus Nos. 2,564,101 and 2,580,666 issued respectively on Aug. 14, 1951 and Jan. 1, 1952. Each of these shows a stud assembly embracing a cup to house the head and part of the stud shank. A spring is disposed within the cup, to thrust against the stud and yieldingly retain the latter in a projected position. To complete the assembly, the outer cup is constricted to define an opening smaller than the stud head and thus confine the latter. This constriction will destroy the appearance of any finish, or coating applied to the cup at the time of its manufacture.

Summary of the invention

To overcome these difficulties, the present invention comprises a cup in final form, the outer end of the cup defining an opening of larger diameter than the diameter of the stud head. Therefore, the stud and its associated spring are not introduced into the cup until the latter is mounted. Such mounting is not difficult, in that a bucking tool may be readily introduced through the outer open end of the cup and caused to firmly bear against the shoulder at its base. Thereupon the mounting flange of the cup is expanded or flanged, to lock the sleeve against movement with respect to its supporting member. Only after this is achieved and the tool withdrawn, is the stud and its encircling spring inserted into the cup and retained therein.

In accordance with the foregoing it is therefore a primary object of the invention to provide a fastener stud assembly in which the cup is primarily affixed to its support, after which the stud and its encircling spring are introduced and retained therein without any constricting, or other deformation of the cup being required to assume such retention.

Brief description of the drawing

Referring to the annexed sheet of drawings, showing a preferred form of the invention:

FIG. 1 is a side elevation of the several parts of the unit is separated condition, with the cup element shown in section;

FIG. 2 is a sectional side view of the complete unit in mounted condition; and

FIG. 3 is a similar view, but illustrating the stud in retracted position.

Brief description of the preferred embodiment

In these several views the numeral 5 identifies the shank of the stud, which is hollow and formed with slots 6 providing camming surfaces. The head of the stud is formed with a groove 7, such that it may be turned by a screwdriver, or similar tool. The lower surface of the head is defined by a projecting portion 8, preferably in the form of a flange. As hereinafter brought out a helical spring 9 bears against this projection when the parts are in assembled condition.

A cup, open at both ends, has a side wall 10, which in its outer zone includes an inwardly extending part 11. In its lower or inner end, this wall has a second inward extension in the form of a shoulder 12. Beyond this a mounting portion, such as a flange 13 is included. This serves as a support for the unit after he flange is inserted through an opening in a mounting such as a panel 14 and then flared as as 15 to prevent separation of the parts. A retaining element, such as a snap ring 16 completes the assembly.

By preforming the cup—at the time of its manufacture—to include the inwardly extending part 11, it may be treated, or coated as desired, as a final step in its manufacture. Thus, the cup may be anodized, plated, or otherwise coated or treated, with no danger of subsequently cracking or otherwise destroying the finish. This, because no further deformation of the outer cup zone will occur.

To assemble the parts the stud shank is inserted into the space defined by the coils of spring 9. Thereupon, pressure is exerted on the head of the stud. The area of this head is less than the area of the opening in part 11. Consequently continuing pressure will cause the head to retract wholly into the cup. The snap ring 16, or its equivalent has a normal outer diameter greater than the outer cup opening, its inner diameter being less than the outermost portion of the stud head, i.e. projection, or flange 8.

Therefore, with the stud head pushed inwardly against the thrust of spring 9, to a point where that head is below part 11 of the cup, ample space will be present at the outer cup end to receive the snap ring 16. Consequently by constricting the latter it will present an outer diameter such that it may readily be insered into the cup. Then, as it is released, it will expand to the condition shown in FIG. 3. Thus, it will bear against the inner face of the cup and the upper surface of projecting portion 8. As the pressure on the stud head is released, spring 9 will thrust it outwardly to the position shown in FIG. 2. Under these conditions ring 16 will constrict to a slight extent, due to a camming action in cooperation with the inner surface of part 11. Accordingly it will prevent further stud movement and function as a latch to retain the stud in association with the cup.

When it is desired to mount the unit on a support, such as panel 14, the empty cup will have its flange 13 inserted into the opening in that support to a point where shoulder 12 bears firmly against the support surface. At this time is to be noted that the opening in part 11 is larger than the opening defined by the inner edge of shoulder 12. Therefore a bucking tool having a diameter less than the former opening and greater than the shoulder opening, may now be inserted through part 11 and brought to bear against the inner surface of the shoulder.

Pressure on the tool will maintain the outer shoulder surface in firm contact with the face of the support. Therefore a flaring tool may cooperate with flange 13 to displace it outwardly as at 15. Under this procedure the cup will become fixed with respect to the support.

So secured, the stud, spring and retainer are disposed within the cup as aforedescribed. The mounted assembly is thus ready for cooperation with the rod, or wire 18 associated with the casing. This will be achieved by turning the stud to cause its slots 6 to receive such rod, or wire with their edges riding over the same in camming relationship.

Of course, if desired the stud assembly may be introduced into and secured to the cup, prior to mounting the latter. In such case flange 13 will be introduced into the opening formed in the support and a bucking tool inserted through the opening in part 11. The tool will bear against the outer face of the head 7, or flange 8. Pressure will retract the head to an extent such that spring 9 will transmit the pressure to shoulder 12 to firmly seat the latter. Under those conditions a flaring tool—as aforedescribed—will create the locking part 15.

From the foregoing it is apparent that the purposes of the present invention are achieved. Modification of the parts may be resorted to without departing from the scope of the claims.

Having now described the invention, we claim:

1. A fastener stud assembly comprising a headed stud, a member projecting laterally outwardly from the stud head, an open ended cup enclosing the head and adjacent shank portion of said stud, inwardly extending parts of said cup at the outer and base ends thereof, a spring thrusting against the stud head and encircling its shank, the area of the stud head being less than the area of the opening of the part at the outer cup end, separate latch means supported by said member, laterally projecting from the stud head and movable with the stud head for preventing such head from moving through said opening, the opposite spring end thrusting against the inwardly extending part at the cup base and a mounting flange forming a part of the cup base and projecting outwardly thereof; said flange being susceptible to flaring such that it will lockingly engage the surfaces of a support for such unit.

2. In an assembly as defined in claim 1, such interposed latch means comprising a snap ring having a normal outer diameter greater than the opening at the outer cup end and an inner diameter less than that of said head.

3. In an assembly as defined in claim 1, the inwardly extending part at the cup base defining with its inner edge a diameter less than the opening of the part at the outer cup end.

References Cited

UNITED STATES PATENTS

| | | | |
|---|---|---|---|
| 2,580,666 | 1/1952 | Dzus | 24—221.2 |
| 2,599,207 | 6/1952 | Spahr | 24—221.2 |
| 2,831,520 | 4/1958 | Clarke | 24—221 |
| 3,171,182 | 3/1965 | Danehy | 24—221 |
| 3,218,906 | 11/1965 | Dupree | 151—69 |

BERNARD A. GELAK, Primary Examiner

U.S. Cl. X.R.

151—69